No. 847,457. PATENTED MAR. 19, 1907.
J. J. BARTENSTEIN.
POWER TRANSMISSION DEVICE.
APPLICATION FILED MAR. 30, 1906.
2 SHEETS—SHEET 1.
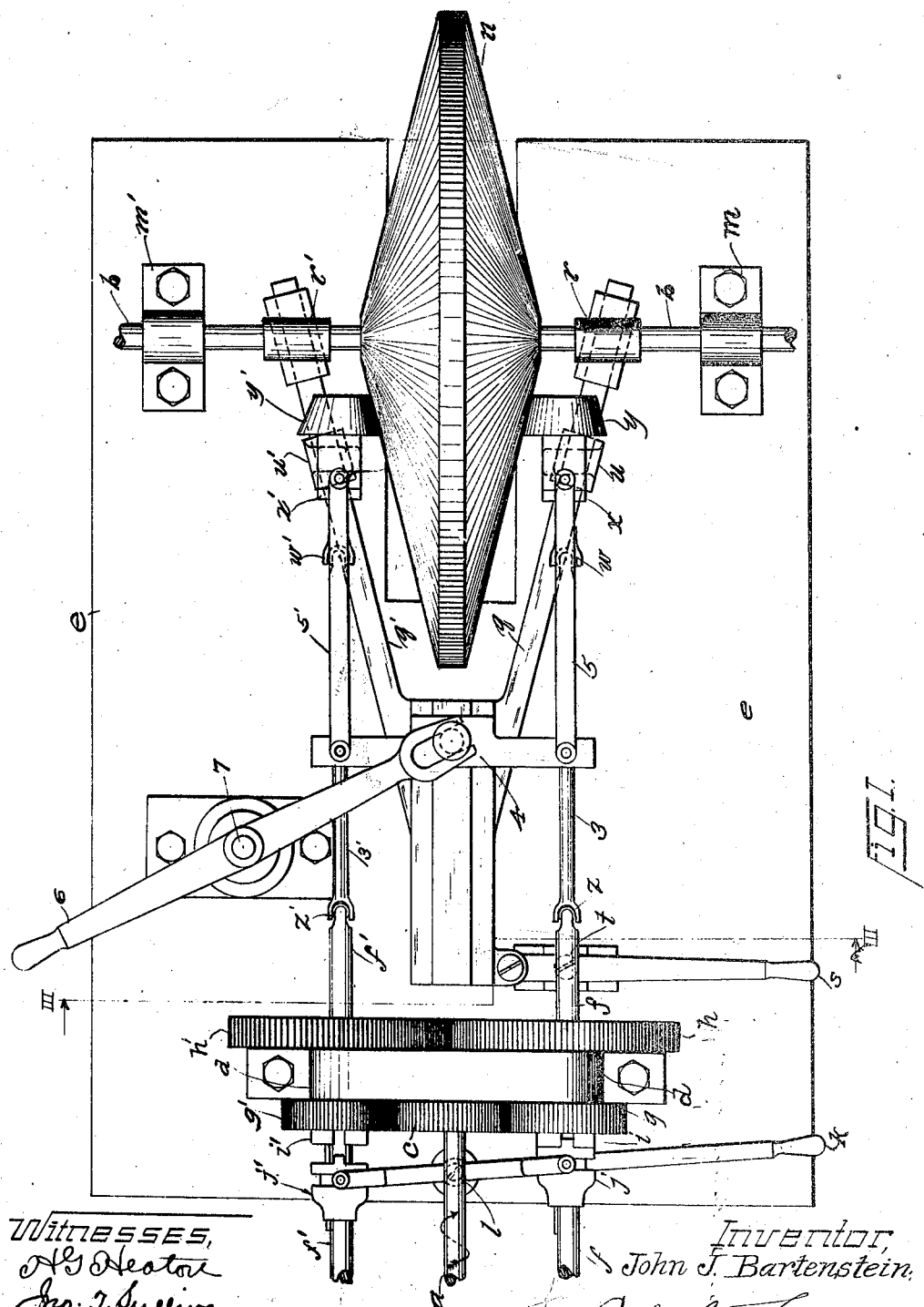
Witnesses,
N. G. Heaton
Jno. T. Sullivan
Inventor,
John J. Bartenstein,
by Luther G. Hopper,
Attorney.

No. 847,457. PATENTED MAR. 19, 1907.
J. J. BARTENSTEIN.
POWER TRANSMISSION DEVICE.
APPLICATION FILED MAR. 30, 1906.
2 SHEETS—SHEET 2.
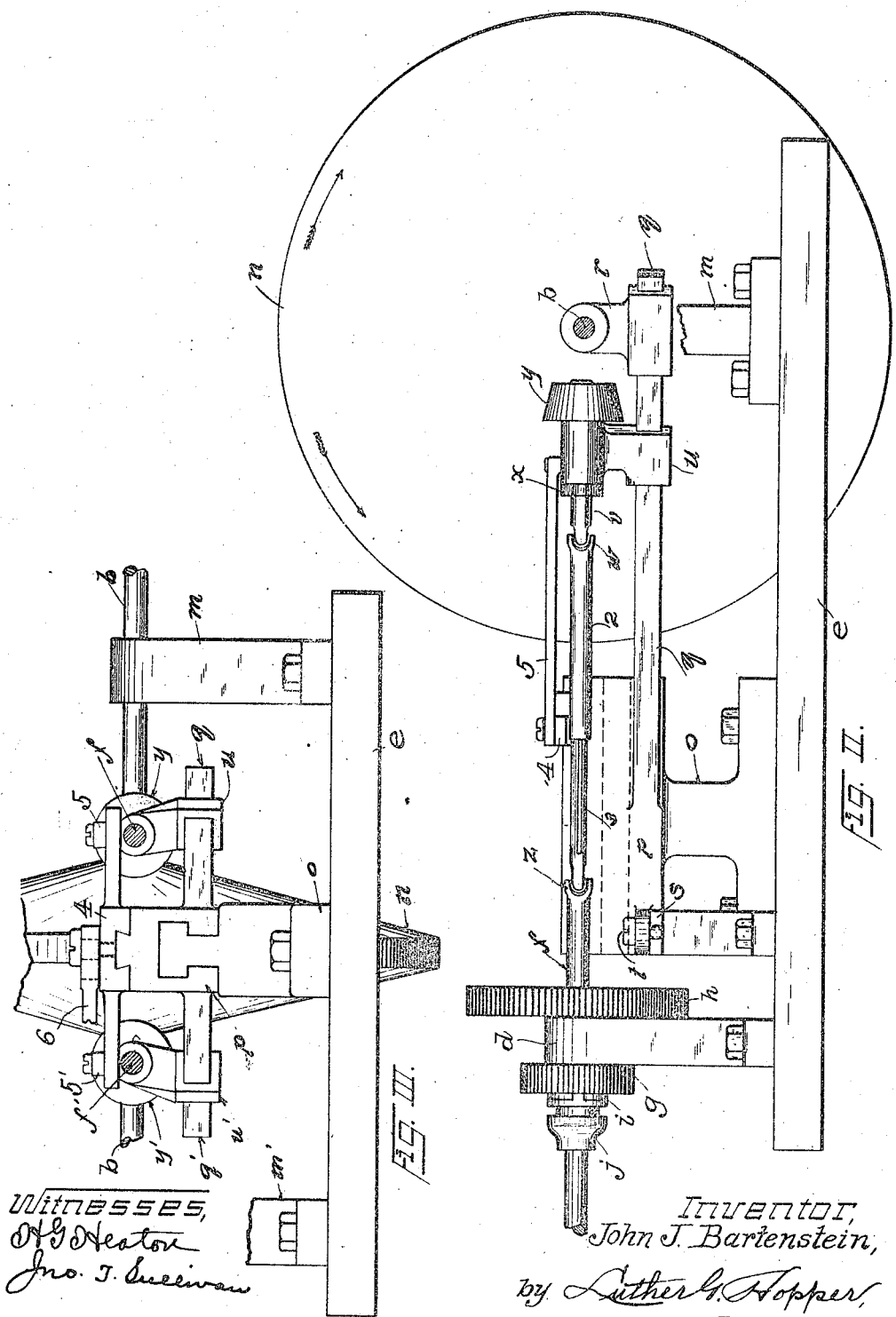
Witnesses,
Inventor,
John J. Bartenstein,
by Luther G. Hopper,
Attorney.

UNITED STATES PATENT OFFICE.

JOHN J. BARTENSTEIN, OF CLEVELAND, OHIO, ASSIGNOR OF ONE-THIRD TO FRANK A. HEISER, AND ONE-THIRD TO CHARLES B. KELLEY, OF CLEVELAND, OHIO.

POWER-TRANSMISSION DEVICE.

No. 847,457.

Specification of Letters Patent.

Patented March 19, 1907.

Application filed March 30, 1906. Serial No. 308,902.

*To all whom it may concern:*

Be it known that I, JOHN J. BARTENSTEIN, a citizen of the United States, residing at Cleveland, in the county of Cuyahoga and State of Ohio, have invented certain new and useful Improvements in Power-Transmission Devices, of which the following is a specification.

This invention relates to mechanisms for transmitting power from a rotatable driving-shaft to a driven shaft, and more particularly to transmitting mechanisms provided with friction driving means, variable-speed arrangements, and reversible movements.

My invention is capable of extensive application in mechanics, and its principal object is to secure greater efficiency through simpler and more convenient means than those heretofore known.

Further objects are to provide friction members having a maximum durability and driving power, together with improved means for regulating the pressure between said members and for changing the relative speed of said members.

To these ends my invention consists in the features, arrangements, and combinations hereinafter described and definitely claimed, an embodiment thereof being illustrated in the accompanying drawings, in which—

Figure I is a plan view, and Fig. II is a side elevation, of the transmitting mechanism. Fig. III is a sectional elevation taken on line III III of Fig. I.

It is obvious that the mechanism may be driven from either end; but I prefer that the shaft indicated by the reference-letter $a$ be the driving-shaft and $b$ the shaft to be driven by the device. The power-shaft $a$ has a bearing in the standard $d$, which standard is supported upon a suitable base-plate or foundation $e$, and said shaft is provided with a spur gear-wheel $c$, fixed thereon. Rotatably mounted in bearings in the standard $d$, upon either side and parallel to the shaft $a$, is a pair of shafts $f$ and $f''$, adapted to be driven by the shaft $a$. Several forms of clutch and gearing mechanism may be employed to accomplish the proper driving of the shafts $f$ and $f''$; but I now consider the form shown herein to be preferable and will proceed to describe it.

A spur gear-wheel $g$ is mounted to run loosely upon the shaft $f$, and a similar spur-wheel $g'$ is loosely mounted upon the shaft $f''$, both wheels $g$ and $g'$ meshing with the driving-wheel $c$. Spur-wheels $h$ and $h'$ of the same size and meshing together are keyed, respectively, to the shafts $f$ and $f''$. The outer faces of the wheels $g$ and $g'$ are provided, respectively, with clutch-jaws, as shown at $i$ and $i'$, and slidable collars $j$ and $j'$, mounted, respectively, over feather-keys upon the shafts $f$ and $f''$, are provided with corresponding jaws adapted to engage the jaws $i$ and $i'$. A hand-lever $k$ is pivoted at $l$ to some part or extension of the base-plate $e$ and provided with the usual forks adapted to engage with and slide the clutch members $j$ and $j'$ along their shafts. The lever $k$ is so placed that by moving it to the right, as shown in Fig. I, the shaft $f$ will be driven through the wheels $c$ and $g$ and clutch member $j$, and shaft $f''$ will be driven at the same speed, but in the opposite direction, through the wheels $h$ and $h'$. When the lever $k$ is moved to the left, the shaft $f''$ will be driven by the wheels $c$ and $g'$ and clutch member $j'$, and the shaft $f$ will be revolved in the opposite direction at the same speed by the wheels $h'$ and $h$. A central position of the lever $k$ should release both clutches. Thus it will be seen that the shafts $f$ and $f''$ are driven always at equal speeds with each other, but in directions opposite to each other, that their direction of revolution is reversed by shifting the lever $k$ from one end of its travel to the other, and that the mechanism comes to rest when the lever $k$ is permitted to remain at its middle position.

The shaft $b$ is rotatably mounted in suitable bearings $m$ and $m'$ and has rigidly secured thereto a friction-disk $n$, having conical side faces, as plainly shown in Figs. I and III. A standard $o$, secured to the base-plate or foundation, has slidably mounted upon it a slide-block $p$, suitably guided, as shown, and provided with arms $q$ and $q'$, which arms are in cross-section, preferably square, and are extended parallel with and equidistant from the respective conical side faces of the friction-wheel $n$, terminating beyond and underneath the shaft $b$. Hangers $r$ and $r'$ for supporting the ends of the fork-arms $q$ and $q'$ are suspended from loose bearings upon the shaft $b$ and provided at their lower ends with slidable bearings for the said fork-arms. A lever $s$, pivoted upon a suitable support at $t$ and operatively connected, as shown, to the fork-block $p$, forms a means for sliding the forks toward or away from the friction-disk $n$; but other well-known means may be employed for holding and shifting the fork-block, if preferred.

Slidably disposed upon the fork-arms $q$ and $q'$, respectively, are bearings $u$ and $u'$, in which the short shafts $v$ and $v'$ are rotatably mounted, said shafts having secured upon their forward ends, respectively, friction-cones $y$ and $y'$, adapted to fit against the side faces of the disk $n$. Collars $x$ and $x'$ are provided to prevent longitudinal displacement of the shafts $v$ and $v'$. Knuckle-joints $w$ and $w'$ and $z$ and $z'$ are employed to connect with the respective shafts $f$ and $f'$ and $v$ and $v'$ to the intermediate telescoping shafts, thus forming universally-jointed connections. The last-named shafts consist of hollow shafts 2 and 2', having shafts 3 and 3' adapted to slide therein and provided with means, such as the key shown in Fig. II, to prevent rotation upon each other. A slipper or cross-head 4 is arranged to slide in suitable guides upon the upper face of the fork-block $p$, having lateral extensions operatively connected, respectively, to the bearings $u$ and $u'$ by links or connecting-rods 5 and 5'. The speed-changing lever 6, Fig. I, is pivoted to an extraneous support at 7 and adapted to engage the slipper 4, as shown.

In the operation of the device it is apparent that by moving the fork-block $p$ away from the disk $n$, through the medium of the lever $s$ or other suitable means, the driving-cones $y$ and $y'$ will be drawn out of contact with the disk $n$, and by thrusting the block $p$ forward the cones $y$ and $y'$ will be brought into engagement with the disk $n$ and may be pressed against the faces thereof with as much force as may be necessary to secure the proper amount of friction between the said conical surfaces. The speed of rotation of the shaft $b$ may be varied at will by shifting the lever 6, which operates to draw the cones $y$ and $y'$ outward toward the periphery of the disk $n$ or to thrust them inward toward the shaft $b$. The advantages of using conical friction members, and thereby securing a minimum slip of the friction-surfaces upon each other and also the advantages of a central friction-disk pressed between the driving-gears will be obvious to those conversant with mechanical principles.

Having thus described my invention so that those skilled in the art to which it appertains can make and use it, either in the form shown herein or under some modification thereof, what I claim as new, and desire to secure by Letters Patent, is—

1. In a power-transmitting mechanism, the combination with a rotatable shaft, of a friction-wheel having conical side faces, a pair of friction-cones adapted to engage the side faces of said wheel respectively, operative connections between said rotatable shaft and said cones adapted to rotate said cones in opposite directions, and means for sliding said cones along the side faces of said wheels without varying the relative angles of the contacting surfaces thereof, substantially as set forth.

2. In a power-transmitting mechanism, the combination with a rotatable shaft, of a friction-wheel having conical side faces, a pair of friction-cones adapted to engage the side faces of said wheel respectively, operative connections between said rotatable shaft and said cones adapted to rotate said cones in opposite directions, means for sliding said cones along the side faces of said wheel without varying the relative angles of the contacting surfaces thereof, and means for moving said cones radially of said wheel, substantially as set forth.

3. In a power-transmitting mechanism, the combination with a rotatable shaft, of a friction-wheel having conical side faces, a pair of friction-cones adapted to engage the side faces of said wheel respectively, operative connections between said rotatable shaft and said cones adapted to rotate said cones in opposite directions, mechanism for reversing the motion of said cones, and means for sliding said cones along the side faces of said wheel without varying the relative angles of the contacting surfaces thereof, substantially as set forth.

4. In a power-transmitting mechanism, the combination with a rotatable shaft, of a friction-wheel having conical side faces, a pair of friction-cones adapted to engage the side faces of said wheel respectively, operative connections between said rotatable shaft and said cones adapted to rotate said cones in opposite directions, mechanism for reversing the motion of said cones, means for sliding said cones along the side faces of said wheel, and means for moving said cones into and out of contact with said wheel, substantially as set forth.

5. The combination with a rotatable friction-wheel having conical side faces, of a slide-block provided with arms extended parallel respectively with the side faces of said wheel, a slidable bearing upon each of said arms, friction-cones rotatably mounted respectively in said slidable bearings and fitted to engage the respective side faces of said wheel, means for reciprocating said slide-block toward and from said wheel, and means for rotating said friction-cones in opposite directions, substantially as set forth.

6. The combination with a rotatable friction-wheel having conical side faces, of a slide-block provided with arms extended parallel respectively with the side faces of said wheel, a slidable bearing upon each of said arms, friction-cones rotatably mounted respectively in said slidable bearings and fitted to engage the respective side faces of said wheel, means for reciprocating said slide-block toward and from said wheel, means for reciprocating said slidable bearings along the respective arms of said slide-block, and means for rotating said friction-cones in opposite directions, substantially as set forth.

7. The combination with a rotatable shaft, and a friction-wheel secured thereon having conical side faces, of a slide-block in front of said wheel provided with arms extended beyond said shaft and parallel respectively with the side faces of said wheel, hangers loosely mounted upon said shaft for slidably supporting said arms respectively, a bearing slidably mounted upon each of said arms, friction-cones rotatably mounted respectively in said bearings and fitted to engage the respective side faces of said wheel, means for reciprocating said slide-block toward and from said wheel, and operative connections to said friction-cones, substantially as set forth.

8. The combination with a rotatable shaft, and a friction-wheel secured thereon having conical side faces, of a slide-block in front of said wheel provided with arms extended beyond said shaft and parallel respectively with the side faces of said wheel, hangers loosely mounted upon said shaft for slidably supporting said arms respectively, a bearing slidably mounted upon each of said arms, friction-cones rotatably mounted respectively in said bearings and fitted to engage the respective side faces of said wheel, means for reciprocating said slide-block toward and from said wheel, means for sliding said bearings along said arms, and rotatable shaft connections to said friction-cones, substantially as set forth.

9. The combination with a rotatable friction-wheel having conical side faces, and a pair of friction-cones rotatably mounted one upon each side of said wheel, of means for moving said cones into and out of contact with said wheel, means for shifting said cones along the side faces of said wheel, a pair of parallel shafts geared together, universally-jointed and telescoping rotatable shaft connections between said friction-cones and said parallel shafts respectively, a driving-shaft, and suitable power-transmitting and clutch mechanism connecting said driving-shaft with said parallel shafts, substantially as set forth.

In testimony whereof I have hereunto affixed my signature, in the presence of two subscribing witnesses, at Cleveland, Ohio, this 10th day of August, 1905.

JOHN J. BARTENSTEIN.

Witnesses:
FRANK A. HEISER,
CHAS. B. KELLEY.